(12) United States Patent
Hayzen (10) Patent No.: US 11,506,569 B2
(45) Date of Patent: Nov. 22, 2022

(54) BEARING AND FAULT FREQUENCY IDENTIFICATION FROM VIBRATION SPECTRAL PLOTS

(71) Applicant: Computational Systems, Inc., Knoxville, TN (US)

(72) Inventor: Anthony J. Hayzen, Knoxville, TN (US)

(73) Assignee: Computational Systems, Inc., Knoxville, TN (US)

( * ) Notice: Subject to any disclaimer, the term of this patent is extended or adjusted under 35 U.S.C. 154(b) by 983 days.

(21) Appl. No.: 16/248,345

(22) Filed: Jan. 15, 2019

(65) Prior Publication Data

US 2020/0225117 A1 Jul. 16, 2020

(51) Int. Cl.
*G01M 13/045* (2019.01)
*F16C 19/04* (2006.01)

(52) U.S. Cl.
CPC ........... *G01M 13/045* (2013.01); *F16C 19/04* (2013.01); *F16C 2233/00* (2013.01)

(58) Field of Classification Search
CPC .................................................. G01M 13/045
See application file for complete search history.

(56) References Cited

U.S. PATENT DOCUMENTS

| | | | |
|---|---|---|---|
| 6,389,887 | B1 | 5/2002 | Dusserre-Telmon et al. |
| 6,526,831 | B2 * | 3/2003 | Ben-Romdhane ........................... G01M 13/028 73/660 |
| 6,802,221 | B2 | 10/2004 | Hedeen et al. |
| 7,930,111 | B2 | 4/2011 | Luo et al. |
| 9,091,588 | B2 | 7/2015 | Lefler |
| 9,645,046 | B2 | 5/2017 | Zhang et al. |
| 9,791,856 | B2 | 10/2017 | Hatch et al. |
| 2002/0139191 | A1 * | 10/2002 | Hedeen ............... G01M 13/045 73/579 |

(Continued)

FOREIGN PATENT DOCUMENTS

| | | |
|---|---|---|
| CN | 102798529 A | 11/2012 |
| CN | 107631877 A | 1/2018 |

(Continued)

*Primary Examiner* — Lisa E Peters
(74) *Attorney, Agent, or Firm* — Luedeka Neely Group, P.C.

(57) ABSTRACT

A vibration measurement and analysis system identifies faulty bearings in a machine based on spectral vibration data. The system includes vibration sensors attached to the machine that generate vibration signals. A vibration data collector generates vibration spectral data based on the vibration signals. The vibration spectral data comprises vibration amplitude versus frequency data that includes peak amplitudes at corresponding peak frequencies. At least some of the peak amplitudes are associated with vibration generated by the faulty bearings. A vibration analysis computer processes the vibration spectral data to (1) locate the largest peak amplitudes, (2) search a bearing fault frequency library to generate a list of identified bearings having bearing fault frequencies matching the peak frequencies of the largest peak amplitudes, (3) determine a normalized accuracy error for each of the identified bearings, and (4) select from the list one of the identified bearings having a smallest normalized accuracy error.

19 Claims, 7 Drawing Sheets

(56) References Cited

U.S. PATENT DOCUMENTS

| | | | |
|---|---|---|---|
| 2003/0065482 A1* | 4/2003 | Bechhoefer | G05B 23/0254 |
| | | | 702/183 |
| 2011/0290024 A1* | 12/2011 | Lefler | G01H 1/003 |
| | | | 73/579 |
| 2012/0316796 A1* | 12/2012 | Goodman | G01M 13/028 |
| | | | 702/39 |
| 2013/0063262 A1* | 3/2013 | Shaikh | G05B 23/0272 |
| | | | 340/540 |
| 2014/0214363 A1* | 7/2014 | Hatch | G05B 19/4065 |
| | | | 702/181 |

FOREIGN PATENT DOCUMENTS

| | | | |
|---|---|---|---|
| IN | 201621003344 | * | 1/2016 |
| WO | 2017145222 A1 | | 8/2017 |

* cited by examiner

BEARING AND FAULT FREQUENCY IDENTIFICATION FROM VIBRATION SPECTRAL PLOTS

FIELD

This invention relates to the field of machine vibration data analysis. More particularly, this invention relates to a system for analyzing predictive maintenance machine vibration spectra to determine if there is a bearing fault, and if so, determining the type of fault.

BACKGROUND

Figure 1:
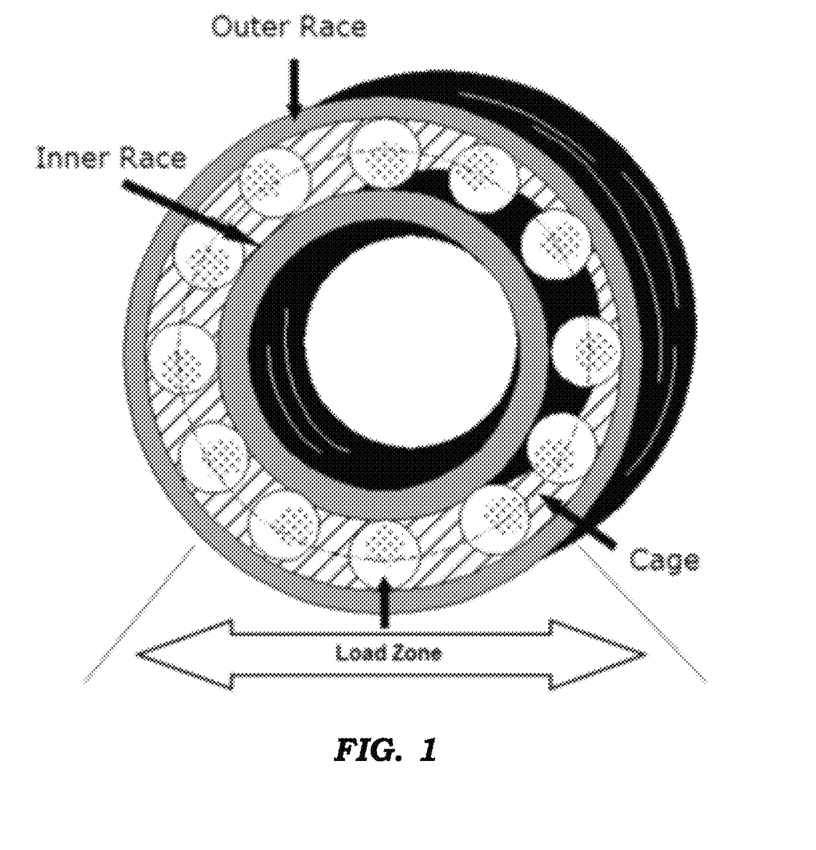
FIG. 1 depicts a typical mechanical configuration of a rolling element bearing.

As shown in FIG. 1, a typical rolling element bearing includes an outer race, an inner race, a cage region disposed between the inner and outer races, and rolling elements (balls) disposed in the cage. Such rolling element bearings have specific bearing failure modes that can be observed in vibration spectral data. Vibration spectral peak frequencies associated with bearing defects are quite different from some other vibration frequencies present in a frequency spectrum of machine vibration because bearing frequencies are defect frequencies. Each defect frequency relates to a particular component of the bearing. For instance, if the Ball Pass Frequency Outer Race (BPFO) defect frequency appears in the spectrum, there is a defect in the outer race of the bearing. If the Ball Spin Frequency (BSF) shows up in the spectrum, there is a defect in one or more of the rollers. This holds true for all of the defect frequencies except for the Fundamental Train Frequency (FTF) or Cage Frequency, which can show up in the frequency spectrum for reasons other than a defect in the cage itself.

Analyzing predictive maintenance machine vibration spectra to determine if there is a bearing fault, and then determining the kind of fault, requires knowledge of the associated fault frequencies for the bearing being monitored. If the relevant bearing properties are not known by the analyst, then accurate bearing fault determination becomes almost impossible.

What is needed is a process that determines the bearing fault frequencies that best match the spectral peaks. This would enable identification of possible bearings having faults. A prerequisite for this process is that there are actual bearing fault spectral peaks in the vibration spectrum (i.e. there is at least the onset of a bearing fault.) Otherwise it is difficult to distinguish bearing fault peaks from general noise peaks.

SUMMARY

Embodiments described herein provide an apparatus and method for identifying machine bearing fault frequencies based on measured machine vibration spectra and thereby identifying which bearings, from an extensive bearing library, match the detected fault frequencies.

Once the bearing fault frequencies have been identified, it is possible to trend the inner, outer, ball spin, and cage interval band energies (summed over all harmonic peaks for each type of energy band) in addition to the typical non-synchronous interval band energy.

A key factor in identifying bearing fault frequencies based on peaks in the vibration spectra is knowledge of the machine rotational speed to a high degree of accuracy. In many situations, particularly with route based portable vibration data collection, machine rotational speed is recorded manually, and therefore is often not sufficiently accurate. A rotational speed algorithm is used to accurately determine the rotational speed.

The above and other needs are met by a vibration measurement and analysis system that identifies one or more faulty bearings in a machine based on spectral vibration data. The system includes one or more vibration sensors, one or more vibration data collectors, and a vibration analysis computer. The vibration sensors are attached to the machine and generate vibration signals based on vibration of the machine. The one or more vibration data collectors include analog-to-digital conversion circuitry and processing circuitry that generates vibration spectral data based on the vibration signals. The vibration spectral data comprises vibration amplitude versus frequency data that includes multiple peak amplitudes at corresponding peak frequencies. At least some of the peak amplitudes are associated with vibration generated by the one or more faulty bearings.

The vibration analysis computer receives the vibration spectral data and executes instructions to:
  locate the largest peak amplitudes within the vibration spectral data;
  perform a search of a bearing fault frequency library to generate a list of identified bearings that have bearing fault frequencies that match within a spectral frequency tolerance the peak frequencies of the largest peak amplitudes; and
  determine a normalized accuracy error for each of the identified bearings in the list; and
  select from the list one of the identified bearings having the smallest normalized accuracy error.

In some embodiments, prior to selection of the identified bearing having the smallest normalized accuracy error, the vibration analysis computer executes instructions to sort the list of identified bearings based on the normalized accuracy errors.

In some embodiments, the vibration analysis computer determines the normalized accuracy error by executing instructions to:
  determine a maximum peak amplitude of the largest amplitude peaks;
  set the spectral frequency tolerance to a selected value;
  set the normalized accuracy error to an initial value;
  for each of the largest amplitude peaks and each harmonic of each of the bearing fault frequencies that match the peak frequencies of the largest peak amplitudes, decrease the normalized accuracy error from the initial value by successive calculations of $$E_r = E_r - F_{tol} \times \frac{A_p/A_{max}}{|F_f - F_p|},$$

wherein $E_r$ is the normalized accuracy error, $F_{tol}$ is the spectral frequency tolerance, $A_p$ is the peak amplitude, $A_{max}$ is the maximum peak amplitude, $F_f$ is the bearing fault frequency or harmonic thereof, and $F_p$ is the peak frequency.

In some embodiments, the vibration analysis computer determines the normalized accuracy error for multiple bearing fault frequency values that include one or more of a Ball Pass Frequency of the Inner race (BPFI), a Ball Pass Frequency of the Outer race (BPFO), a Ball Spin Frequency (BSF), and a Fundamental Train Frequency (FTF).

In some embodiments, the selected value of the spectral frequency tolerance $F_{tol}$ is at least twice a frequency resolution of the vibration spectral data.

In some embodiments, the vibration analysis computer includes a user interface and executes instructions to automatically select from the list an identified bearing having the smallest normalized accuracy error and communicate the selection to a user via the user interface.

In some embodiments, the vibration analysis computer executes instructions to display the list of identified bearings on the user interface and receive a selection of an identified bearing that is entered by the user via the user interface.

In some embodiments, the vibration analysis computer executes instructions to generate and trend one or more energy band scalar values over a period of time for one or more of a Ball Pass Frequency of the Inner race (BPFI), a Ball Pass Frequency of the Outer race (BPFO), a Ball Spin Frequency (BSF), and a Fundamental Train Frequency (FTF) for the identified bearing having a smallest normalized accuracy error.

In some embodiments, the vibration analysis computer executes instructions to consolidate the list of identified bearings by grouping the identified bearings according to similarity in bearing fault frequencies and number of balls in the identified bearings.

In some embodiments, the one or more vibration data collectors include a portable vibration analyzer or a continuous online vibration monitoring system or both.

In another aspect, embodiments of the invention provide a method for identifying one or more faulty bearings in a machine based on spectral vibration data. The method includes the steps of:
(a) generating vibration signals using one or more vibration sensors attached to the machine;
(b) generating vibration spectral data based on the vibration signals, wherein the vibration spectral data comprises vibration amplitude versus frequency data that includes peak amplitudes at corresponding peak frequencies, wherein at least some of the peak amplitudes are associated with vibration generated by the one or more faulty bearings;
(c) locating the largest peak amplitudes within the vibration spectral data;
(d) performing an electronic search of a bearing fault frequency library to generate a list of identified bearings that each has a bearing fault frequency that matches within a spectral frequency tolerance one of the peak frequencies of the largest peak amplitudes;
(e) determining a normalized accuracy error for each of the identified bearings in the list; and
(f) selecting from the list one of the identified bearings having the smallest normalized accuracy error.

In some embodiments, after step (d) and prior to step (f), the method includes sorting the list of identified bearings based on their normalized accuracy errors.

In some embodiments, step (e) includes:
(e1) determining a maximum peak amplitude of the largest amplitude peaks;
(e2) setting the spectral frequency tolerance to a selected value;
(e3) setting the normalized accuracy error to an initial value;
(e4) for each of the largest amplitude peaks and each harmonic of each of the bearing fault frequencies that match the peak frequencies of the largest peak amplitudes, decreasing the normalized accuracy error from the initial value by successive calculations of $$E_r = E_r - F_{tol} \times \frac{A_p/A_{max}}{|F_f - F_p|},$$

wherein $E_r$ is the normalized accuracy error, $F_{tol}$ is the spectral frequency tolerance, $A_p$ is the peak amplitude, $A_{max}$ is the maximum peak amplitude, $F_f$ is the bearing fault frequency or harmonic thereof, and $F_p$ is the peak frequency.

In some embodiments, the method includes performing step (e4) for multiple bearing fault frequency values that include one or more of a Ball Pass Frequency of the Inner race (BPFI), a Ball Pass Frequency of the Outer race (BPFO), a Ball Spin Frequency (BSF), and a Fundamental Train Frequency (FTF).

In some embodiments, step (e2) includes setting the spectral frequency tolerance $F_{tol}$ to the selected value of at least twice the frequency resolution of the vibration spectral data.

In some embodiments, step (f) includes automatically selecting from the list an identified bearing having the smallest normalized accuracy error and communicating the selection to a user via a user interface.

In some embodiments, step (f) includes displaying the list of identified bearings on a user interface and receiving a selection of an identified bearing entered by a user via the user interface.

In some embodiments, the method also includes generating and trending one or more energy band scalar values over a period of time for one or more of a Ball Pass Frequency of the Inner race (BPFI), a Ball Pass Frequency of the Outer race (BPFO), a Ball Spin Frequency (BSF), and a Fundamental Train Frequency (FTF) for the identified bearing having the smallest normalized accuracy error.

In some embodiments, the method includes consolidating the list of identified bearings by grouping the identified bearings according to similarity in bearing fault frequencies and number of balls in the identified bearings.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein.

DETAILED DESCRIPTION

Figure 2:
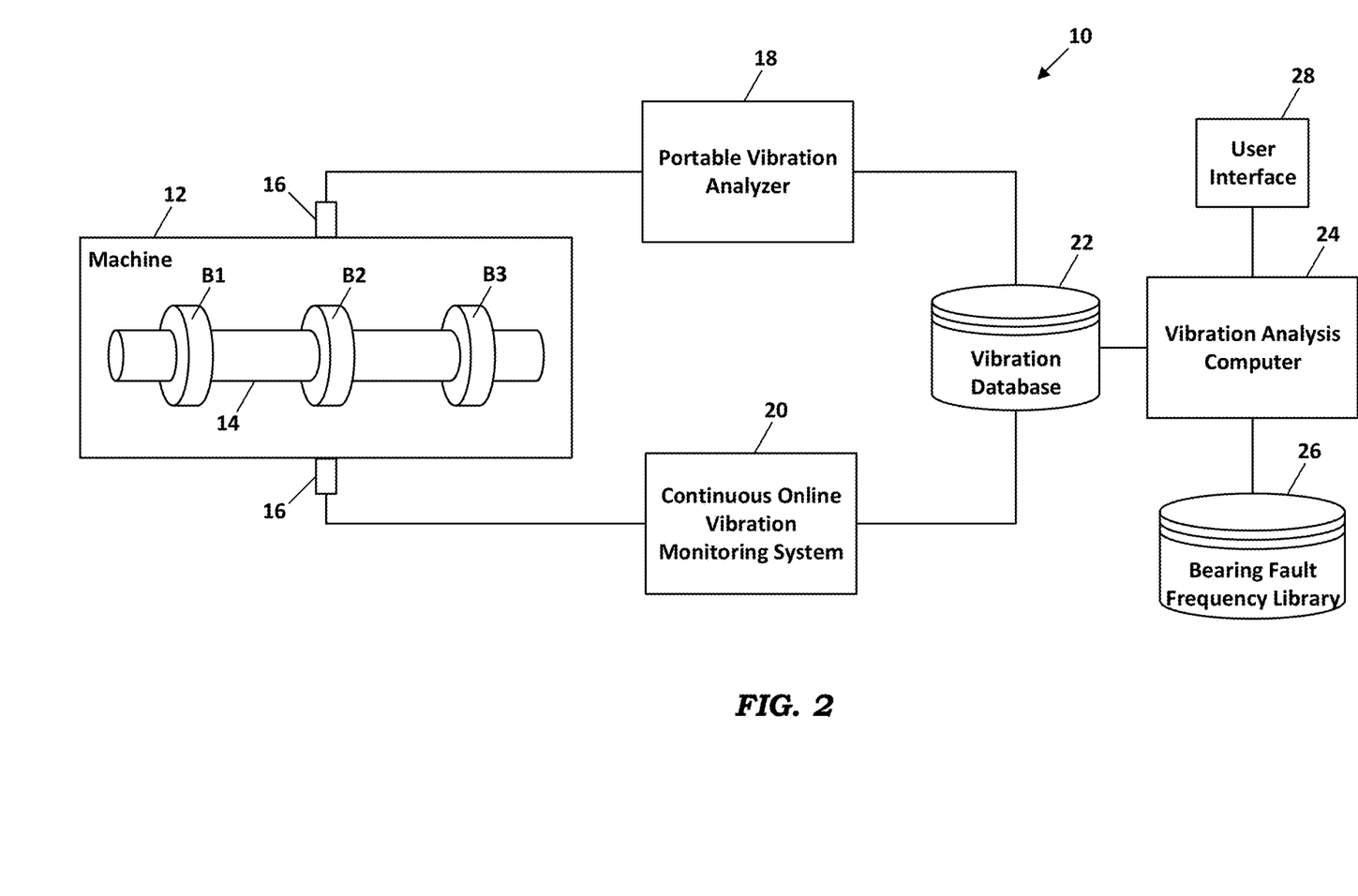
FIG. 2 depicts a vibration measurement and analysis system according to an embodiment of the invention.
Figure 3:
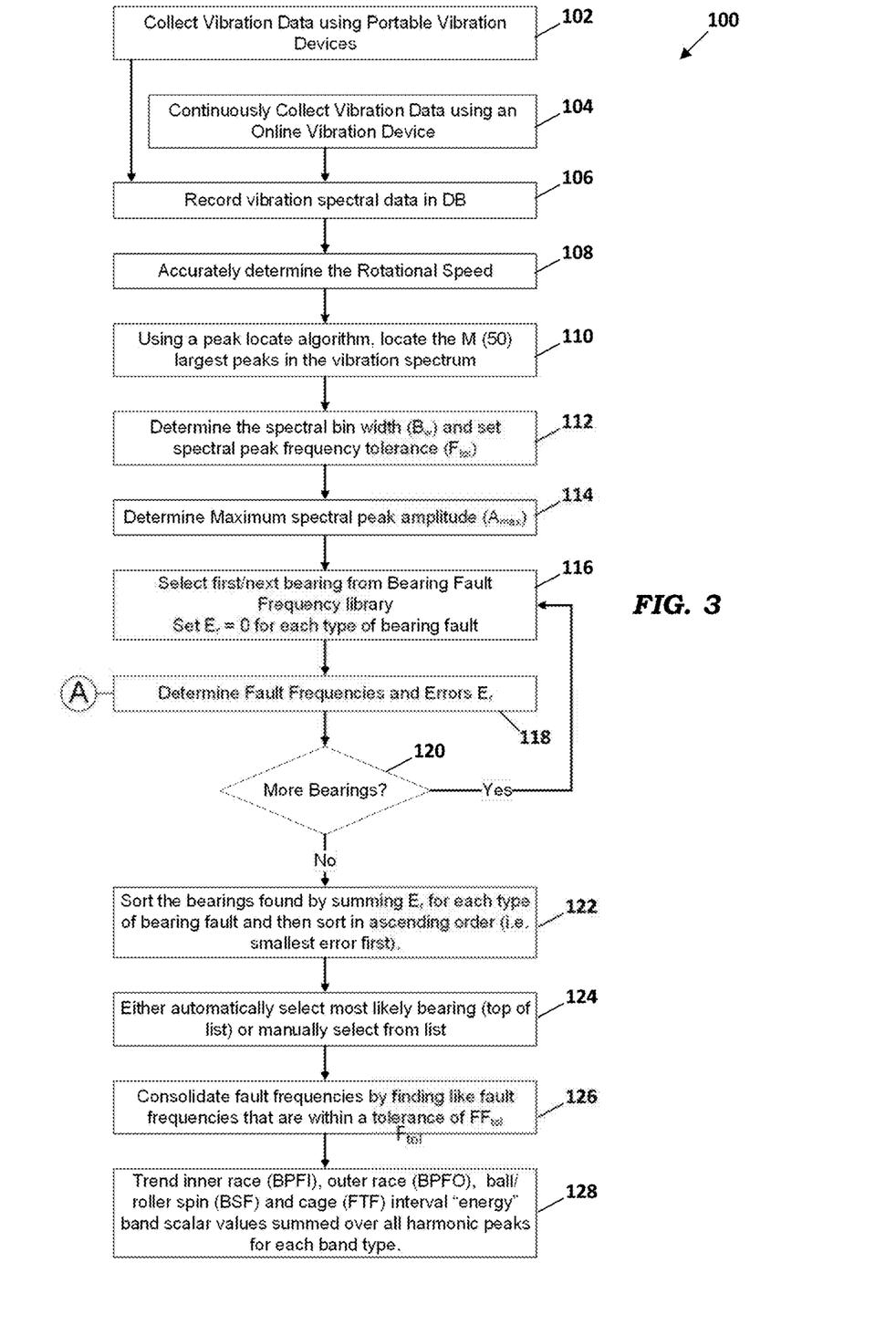
FIGS. 3-5 depict a process for analyzing vibration spectral data to determine types of bearing faults according to an embodiment of the invention.

As depicted in FIG. 2, a vibration measurement and analysis system includes vibration sensors 16 attached to a machine 12. FIG. 3 depicts a process 100 performed using the system of FIG. 2 for collecting and analyzing vibration data to identify types of bearing faults in the machine 12. The machine 12 includes at least one rotating component 14, such as a shaft, supported by bearings B1, B2, and B3. The vibration sensors 16 are preferably placed on the machine 12 in vertical, horizontal and axial positions at each bearing location. Thus, there may be three sensors 16 associated with each of the bearings B1, B2, and B3. The vibration sensors 16 generate vibration signals representative of the vibration of the machine 12, which includes vibration components associated with the bearings B1, B2, and B3. The vibration signals are received, conditioned, and converted to time waveform digital data by one or more vibration data collectors, such as a portable vibration analyzer 18 or a continuous online vibration monitoring system 20 (steps 102 and 104). The vibration data collectors 18 and 20 include signal conditioning circuitry and analog-to-digital conversion circuitry for conditioning the vibration signals from the sensors 16 and generating the time waveform digital vibration data based thereon.

In preferred embodiments, the portable vibration analyzer 18 or the continuous online vibration monitoring system 20 performs a Fast Fourier Transform (FFT) on the vibration time waveform data to generate vibration spectral data. The vibration time waveform data and vibration spectral data are preferably stored in a vibration database 22 from which the data is available for analysis by software routines executed on a vibration analysis computer 24 (step 106). In preferred embodiments, the system 10 includes a user interface 28, such as a touch screen, that allows a user to view measurement results, select certain measurement parameters, and provide other input as described herein.

An important property of the vibration spectrum is the rotational speed of the rotating component 14 of the machine 12 being monitored, because bearing fault frequencies are related to the rotational speed. In many situations, the rotational speed is not very accurately recorded, a problem that often arises with the use of portable vibration analyzers. A rotational speed algorithm may be used to accurately determine the rotational speed (step 108), such as described in U.S. patent application Ser. No. 15/946,403 titled "Determination of RPM from Vibration Spectral Plots," the entirety of which is incorporated herein by reference.

Generally, determining the frequency of amplitude peaks in the vibration spectrum is only as accurate as the resolution of the spectrum. The resolution can be improved by using a peak locating process that takes into account adjacent points to more accurately pinpoint amplitude peaks and their associated frequencies (step 110). In a preferred embodiment, the largest M number of peaks are used by the algorithm. For example, M may be fifty (50).

It will be appreciated that for variable speed machines, even if the above described rotational speed algorithm is used, there may still be some small inaccuracy if the speed of the machine varies slightly during the acquisition of the vibration time waveform from which the spectrum is derived. This slight speed variation may be partly compensated for by setting the frequency tolerance ($F_{tol}$) at an appropriate level (step 112) $F_{tol}$ is typically set to twice the frequency resolution of the FFT spectrum so that small variations in the placement of the bearing fault frequency peaks are not missed. $F_{tol}$ can be adjusted by the user if necessary.

In the preferred embodiment, the next step is to determine the maximum peak amplitude $A_{max}$ in the spectrum (step 114).

For each of the amplitude peaks located in step 110, a search of the bearing fault frequency library is performed (steps 116, 118, and 120) to identify bearings that have fault frequencies that match the frequencies of the M number of peaks located in step 110. In a preferred embodiment, the bearing fault frequency library is a database of about 100,000 bearings and their associated fault frequencies. Those fault frequencies preferably include the Ball Pass Frequency of the Inner race (BPFI), Ball Pass Frequency of the Outer race (BPFO), Ball Spin Frequency (BSF), and Fundamental Train Frequency (FTF). Those of ordinary skill in the art will appreciate that identification of bearings having matching fault frequencies is possible only if the spectrum contains peaks associated with at least the onset of a bearing fault.

Once the bearings have been identified they are sorted according to the highest likelihood of having a fault (step 122). In a preferred embodiment, the bearings are sorted by summing a normalized accuracy value $E_r$ for each type of bearing fault and then sorting in ascending order (i.e. smallest error first). This lists the bearings with the most likely ones first. Determination of the normalized accuracy value $E_r$ is discussed in more detail hereinafter.

In a preferred embodiment, the system 10 then either automatically chooses the most likely faulty bearing or presents a list of the most likely faulty bearings on the user interface 28 from which the user makes a selection (step 124). By specifying the particular bearing or limiting the list of bearings from which the user selects, the system 10 provides a significant advantage in the field of machine maintenance. Without this selection information provided by the system 10, a vibration analyst would have to choose the faulty bearing from thousands stored in the bearing fault library 26. If the bearing had been previously identified, then step 124 may confirm that the bearing had not been changed.

Because many bearings have the same or very similar fault frequencies, the most likely bearings can further be consolidated into the most likely fault frequencies (step 126). If the user is unsure of the actual bearings being used in the machine being monitored, the user can select the most appropriate fault frequency set from the consolidated list to associate with the machine.

Finally, knowing the fault frequency set, the BPFI, BPFO, BSF, and FTF interval "energy" band scalar measurements are automatically derived and trended by summing the energy band scalar values over all harmonic peaks for each band type (step 128). This information allows the analyst to monitor the progress of bearing faults without necessarily having the knowledge or time to analyze each individual spectrum.

During the lifetime of a machine, a damaged or worn bearing may be replaced during maintenance. Thus, it would be beneficial to store the actual bearing fault frequency set each time a bearing is changed so that historical data may be re-evaluated.

With reference to FIGS. 2 and 3, a preferred embodiment provides two ways to search for matching bearing fault frequencies peaks in step 118. The most general case is to search all the located peaks in the spectra for matches to the BPFI, BPFO, BSF and FTF fault frequencies for each of the bearings in the bearing fault frequency library (steps 118a and 118b). A more focused approach is for the analyst to select a particular spectral peak of interest, such as a BPFI, BPFO or BSF peak, and then search the bearing fault frequency library for matches to only that particular peak (i.e. the peak list contains only the selected peak)(steps 118a and 118c). This typically produces a much shorter list of potential bearing matches. In a preferred embodiment, the user selects a particular peak in the graphical spectrum displayed on the user interface 28 by clicking on the peak or hovering a cursor over the peak and then using a right mouse click to display a dropdown menu of options, one of which is to search the bearing fault frequency library 26 for matches to only that particular peak.

Figure 4:
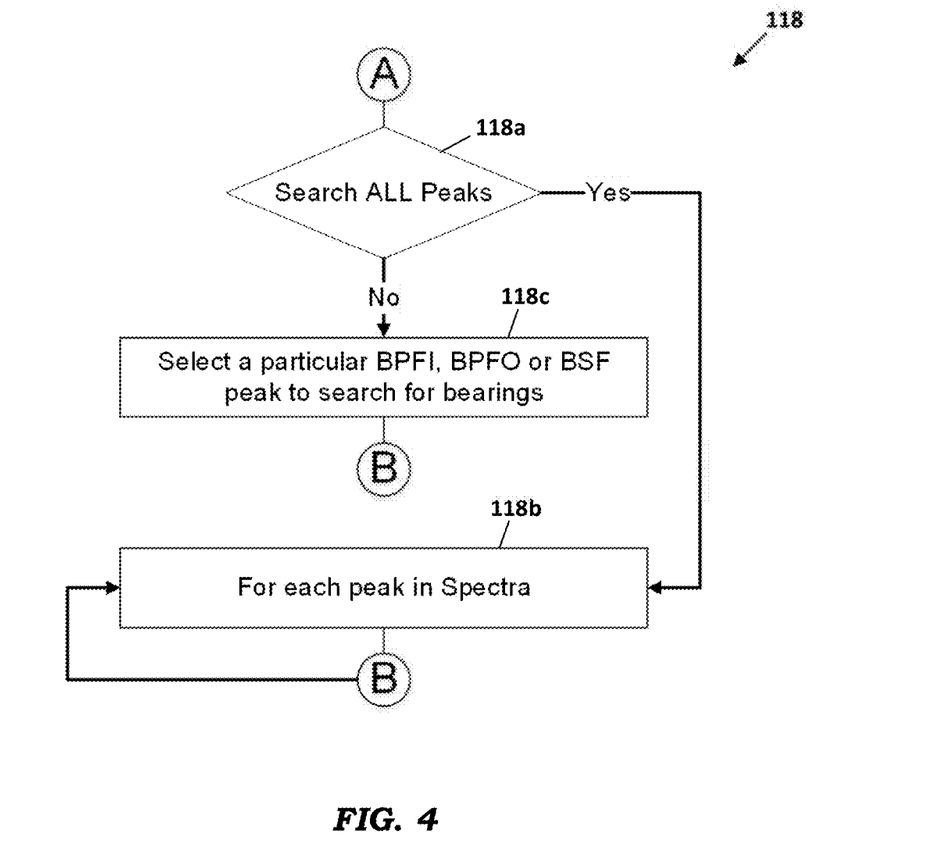

A preferred embodiment of the bearing fault frequency evaluation process is depicted in FIG. 4. The process involves searching all the peaks in the peak list and finding bearing fault frequencies ($F_f$) that match the frequency of the selected peaks ($F_p$) within the specified peak frequency tolerance ($F_{tol}$) (step 130). Specifically, the process involves finding the frequency of the nearest spectral peak ($F_p$) for each harmonic (N) of the rotational speed ($R_S$) for the inner race BPFI fault frequencies ($F_f$) and its lower and upper sidebands ($F_{SL}$ and $F_{SH}$), each within the selected frequency tolerance ($F_{tol}$), where $$F_f = N \times R_S \times BPFI$$

$$F_{SL} = F_f - R_S$$

$$F_{SH} = F_f + R_S$$

The frequency tolerance ($F_{tol}$) is typically set to twice the spectral bin width, but could be set larger if there is some variation in the bearing fault frequency peaks due to bearing wear.

For those bearings for which a match is found, a normalized accuracy error $E_r$ is calculated (step 132). The normalized error algorithm successively decreases the error $E_r$ from an initial arbitrary value of 100 by multiplying the spectral frequency tolerance $F_{tol}$ (i.e. number of spectral bins within which the nearest peak can be found) by the normalized peak amplitude $A_p/A_{max}$ (relative peak importance), and then dividing by the absolute value of the difference in frequency between the fault frequency harmonic ($F_f$) and the nearest peak found ($F_p$). For example, if a peak frequency $F_p$ for $F_f$ is found, then $$E_r = E_r - F_{tol} \times \frac{A_p/A_{max}}{|F_f - F_p|}.$$

If a peak frequency $F_p$ for $F_{SL}$ is found, then $$E_r = E_r - F_{tol} \times \frac{A_p/A_{max}}{|F_{SL} - F_p|}.$$

If a peak frequency $F_p$ for $F_{SH}$ is found, then $$E_r = E_r - F_{tol} \times \frac{A_p/A_{max}}{|F_{SH} - F_p|}.$$

Figure 5:
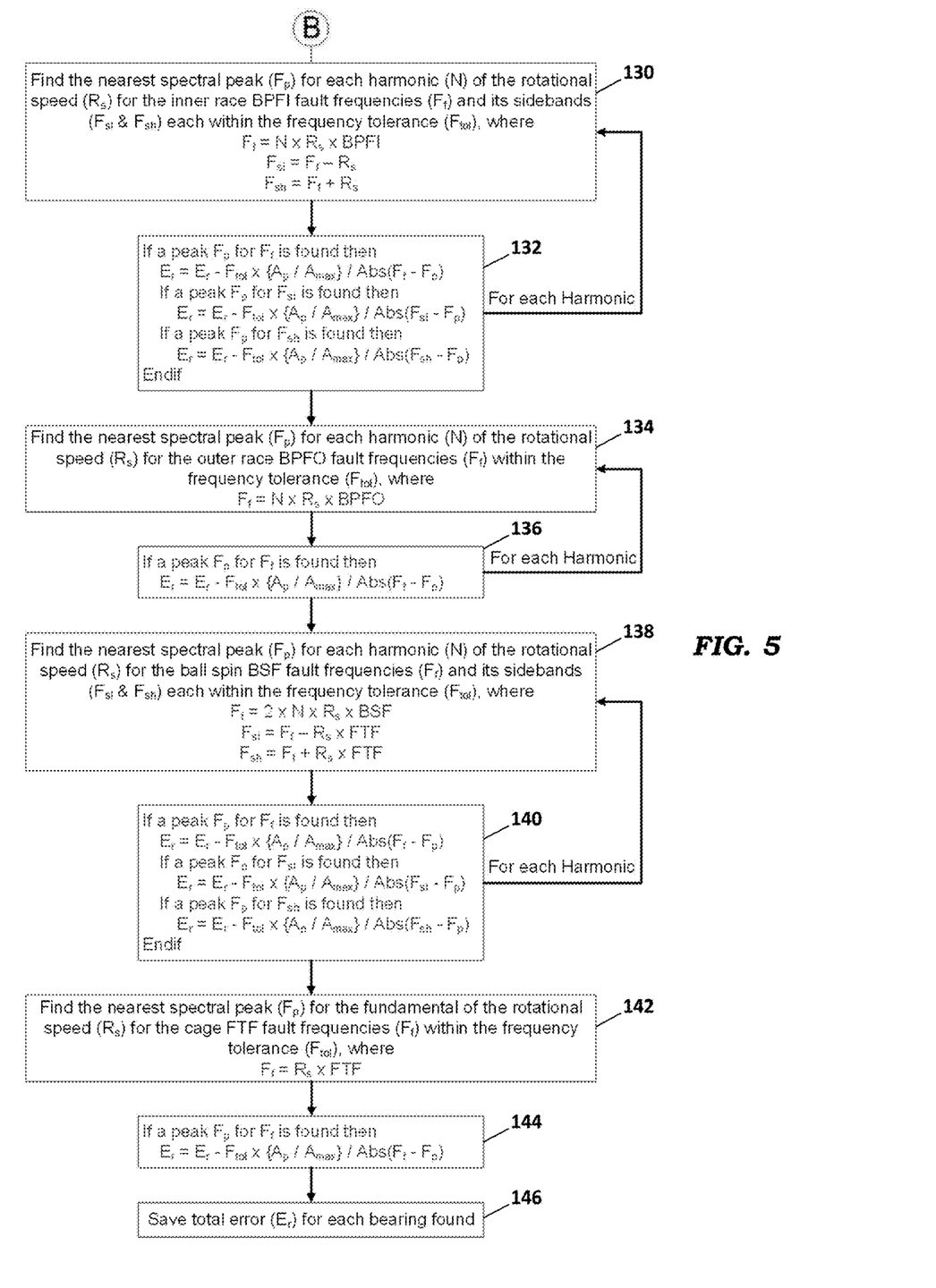

This process is then performed for each harmonic of each of the other types of bearing fault frequencies (steps 134 and 136 for BPFO, steps 138 and 140 for BSF, and steps 142 and 144 for FTF). If the analyst has picked a particular type of fault for consideration, only that bearing fault type is evaluated. The total error $E_r$ is saved for each bearing for which a match is found (step 146).

EXAMPLES

Figure 6:
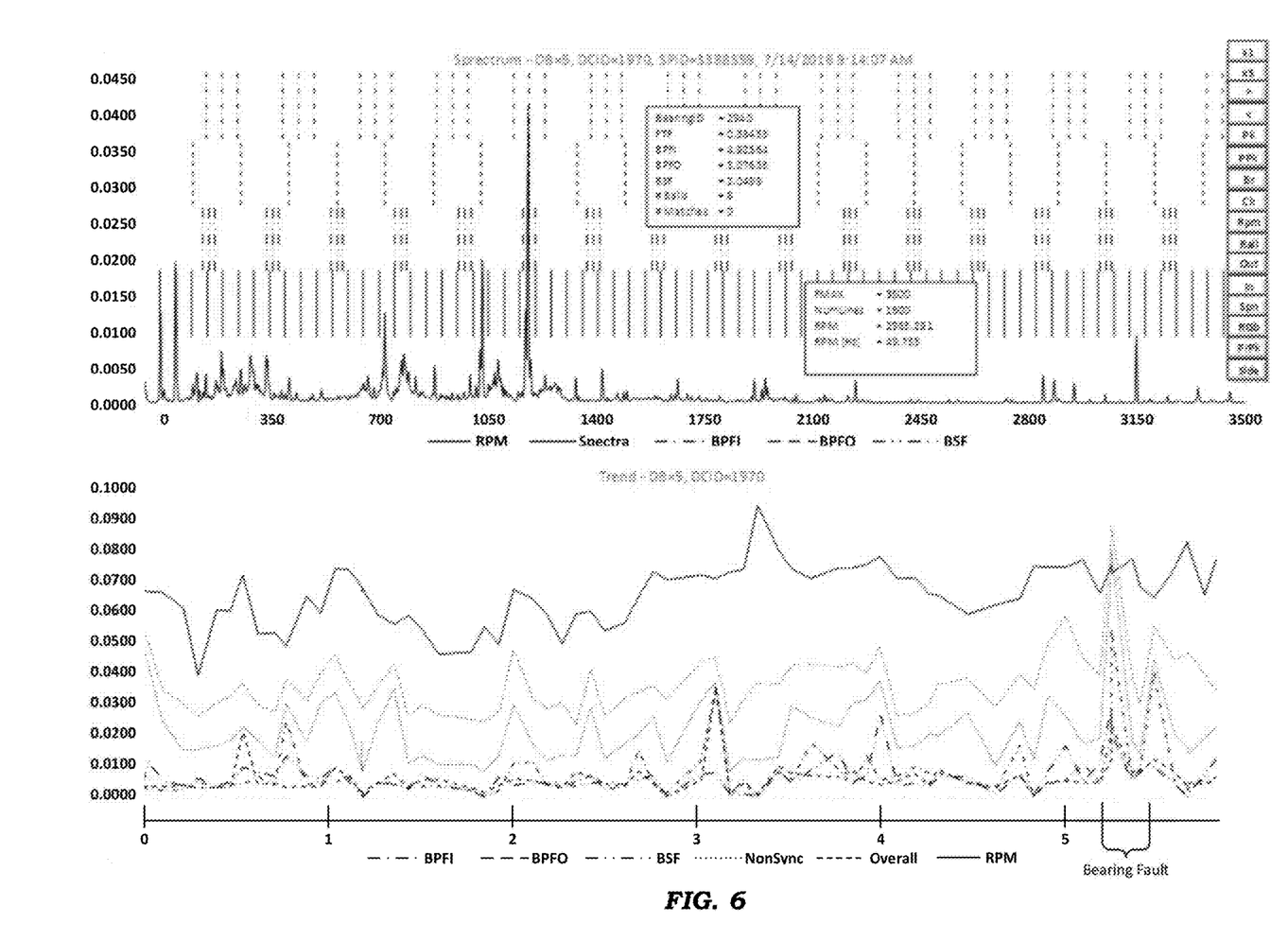
FIGS. 6 and 7 depict examples of vibration spectra having harmonic peaks associated with a diagnosed bearing fault, as measured and analyzed by an embodiment of the invention.

The upper portion of FIG. 6 depicts the spectra and associated BPFO, BPFI, and BSF harmonic peaks for a known bearing with a diagnosed bearing fault. In the lower portion of FIG. 6, the matching trend plot depicts the trends of the inner, outer, ball spin and cage interval band "energies" over the about six years of operation of the machine. The trends clearly indicate a bearing fault occurred in the sixth year during the time range indicated.

Figure 7:
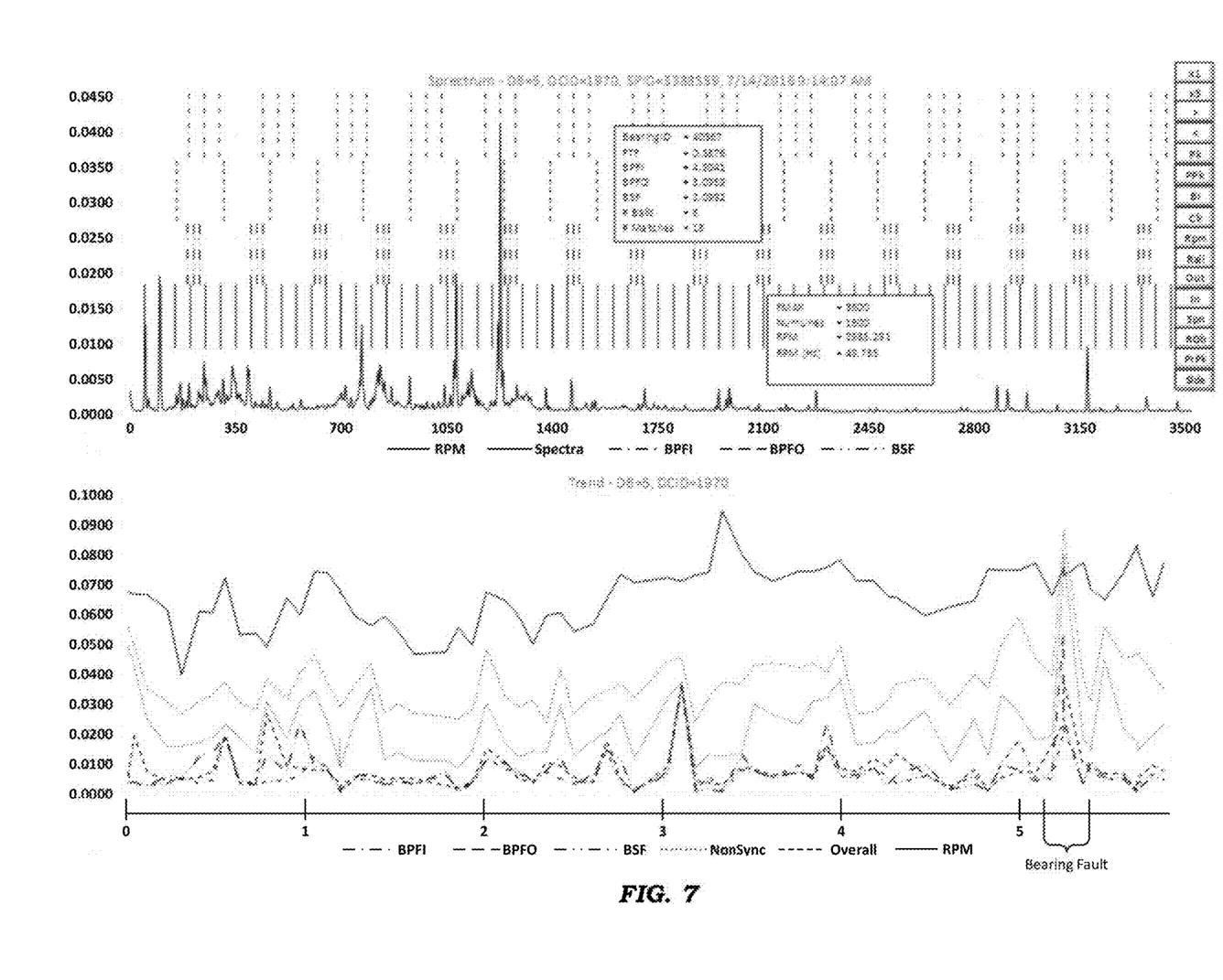

The upper portion of FIG. 7 depicts the spectra and associated BPFO, BPFI, and BSF harmonic peaks for the bearing whose fault frequencies have the closest match to the spectral peaks. In this example, there are 1669 bearings found having fault frequencies within 0.001 of each other and having the same number of balls. The matching trend plot in the lower portion of FIG. 7 depicts the trends of the inner, outer, ball spin and cage interval band "energies" over a six year period of operation of the machine. Again, the trends clearly indicate a bearing fault occurred during the time range indicated in the sixth year.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A vibration measurement and analysis system for identifying one or more faulty bearings in a machine based on spectral vibration data, the machine including rotational components rotating at a rotational speed, the vibration measurement and analysis system comprising:
   one or more vibration sensors attached to the machine that generate vibration signals based on vibration of the machine;
   one or more vibration data collectors in electrical communication with the one or more vibration sensors, the one or more vibration data collectors including analog-to-digital conversion circuitry and processing circuitry that generates vibration spectral data based on the vibration signals, wherein the vibration spectral data comprises vibration amplitude versus frequency data that includes a plurality of peak amplitudes at corresponding peak frequencies, wherein at least some of the peak amplitudes are associated with vibration generated by the one or more faulty bearings;
   a vibration analysis computer that receives the vibration spectral data generated by the one or more vibration data collectors, the vibration analysis computer operable to execute instructions to:
      locate a number M largest peak amplitudes within the vibration spectral data, wherein all other amplitudes within the vibration spectral data are less than each of the M largest peak amplitudes;
      perform a search of a bearing fault frequency library to generate a list of identified bearings that have bearing fault frequencies that match within a spectral frequency tolerance the peak frequencies of the M largest peak amplitudes;
      determine a normalized accuracy error for each of the identified bearings in the list, wherein the normalized accuracy error indicates how closely the bearing fault frequencies of the identified bearings match the peak frequencies of the M largest peak amplitudes, wherein the instructions to determine the normalized accuracy error comprise instructions to:
         determine a maximum peak amplitude of the M largest peak amplitudes;

set the spectral frequency tolerance to a selected value;

set the normalized accuracy error to an initial value;

for each of the M largest peak amplitudes and each harmonic of each of the bearing fault frequencies that match the peak frequencies of the M largest peak amplitudes, decrease the normalized accuracy error from the initial value by successive calculations of $$E_r = E_r - F_{tol} \times \frac{A_p/A_{max}}{|F_f - F_p|},$$

wherein $E_r$ is the normalized accuracy error, $F_{tol}$ is the spectral frequency tolerance, $A_p$ is the peak amplitude, $A_{max}$ is the maximum peak amplitude, $F_f$ is the bearing fault frequency or harmonic thereof, and $F_p$ is the peak frequency; and select from the list one of the identified bearings having a smallest normalized accuracy error.

2. The vibration measurement and analysis system of claim 1 wherein, prior to selection of one of the identified bearings having a smallest normalized accuracy error, the vibration analysis computer executes instructions to sort the list of identified bearings based on the normalized accuracy errors.

3. The vibration measurement and analysis system of claim 1 wherein M is 50.

4. The vibration measurement and analysis system of claim 1 wherein the vibration analysis computer determines the normalized accuracy error for multiple bearing fault frequency values that include one or more of a Ball Pass Frequency of the Inner race (BPFI), a Ball Pass Frequency of the Outer race (BPFO), a Ball Spin Frequency (BSF), and a Fundamental Train Frequency (FTF).

5. The vibration measurement and analysis system of claim 1 wherein the selected value of the spectral frequency tolerance $F_{tol}$ is at least twice a frequency resolution of the vibration spectral data.

6. The vibration measurement and analysis system of claim 1 wherein the vibration analysis computer includes a user interface, and the vibration analysis computer executes instructions to automatically select from the list an identified bearing having the smallest normalized accuracy error and communicate the selection to a user via the user interface.

7. The vibration measurement and analysis system of claim 1 wherein the vibration analysis computer includes a user interface, and the vibration analysis computer executes instructions to display the list of identified bearings on the user interface and receive a selection of an identified bearing that is entered by a user via the user interface.

8. The vibration measurement and analysis system of claim 1 wherein the vibration analysis computer executes instructions to generate and trend one or more energy band scalar values by summing energy over all harmonic peaks for each type of energy band over a period of time, wherein the energy band scalar values include one or more of a Ball Pass Frequency of the Inner race (BPFI), a Ball Pass Frequency of the Outer race (BPFO), a Ball Spin Frequency (BSF), and a Fundamental Train Frequency (FTF) for the identified bearing having a smallest normalized accuracy error.

9. The vibration measurement and analysis system of claim 1 wherein the vibration analysis computer executes instructions to consolidate the list of identified bearings by grouping the identified bearings having the same number of balls and having bearing fault frequencies falling within a specified frequency range.

10. The vibration measurement and analysis system of claim 1 wherein the one or more vibration data collectors include one or both of a portable vibration analyzer and a continuous online vibration monitoring system.

11. A method for identifying one or more faulty bearings in a machine based on spectral vibration data, the machine including rotational components rotating at a rotational speed, the method comprising:

(a) generating vibration signals using one or more vibration sensors attached to the machine;

(b) generating vibration spectral data based on the vibration signals, wherein the vibration spectral data comprises vibration amplitude versus frequency data that includes a plurality of peak amplitudes at corresponding peak frequencies, wherein at least some of the peak amplitudes are associated with vibration generated by the one or more faulty bearings;

(c) locating a number M largest peak amplitudes within the vibration spectral data, wherein all other amplitudes within the vibration spectral data are less than each of the M largest peak amplitudes;

(d) performing an electronic search of a bearing fault frequency library to generate a list of identified bearings that each has a bearing fault frequency that matches within a spectral frequency tolerance one of the peak frequencies of the M largest peak amplitudes;

(e) determining a normalized accuracy error for each of the identified bearings in the list, wherein the normalized accuracy error indicates how closely the bearing fault frequencies of the identified bearings match the peak frequencies of the M largest peak amplitudes, wherein determining the normalized accuracy error comprises:

(e1) determining a maximum peak amplitude of the M largest peak amplitudes;

(e2) setting the spectral frequency tolerance to a selected value;

(e3) setting the normalized accuracy error to an initial value;

(e4) for each of the M largest peak amplitudes and each harmonic of each of the bearing fault frequencies that match the peak frequencies of the M largest peak amplitudes, decreasing the normalized accuracy error from the initial value by successive calculations of $$E_r = E_r - F_{tol} \times \frac{A_p/A_{max}}{|F_f - F_p|},$$

wherein $E_r$ is the normalized accuracy error, $F_{tol}$ is the spectral frequency tolerance, $A_p$ is the peak amplitude, $A_{max}$ is the maximum peak amplitude, $F_f$ is the bearing fault frequency or harmonic thereof, and $F_p$ is the peak frequency; and (f) selecting from the list one of the identified bearings having a smallest normalized accuracy error.

12. The method of claim 11 further comprising, after step (d) and prior to step (f), sorting the list of identified bearings based on their normalized accuracy errors.

13. The method of claim 11 wherein M is 50.

14. The method of claim 11 further comprising performing step (e4) for multiple bearing fault frequency values that include one or more of a Ball Pass Frequency of the Inner race (BPFI), a Ball Pass Frequency of the Outer race (BPFO), a Ball Spin Frequency (BSF), and a Fundamental Train Frequency (FTF).

15. The method of claim 11 wherein step (e2) comprises setting the spectral frequency tolerance $F_{tol}$ to the selected value of at least twice a frequency resolution of the vibration spectral data.

16. The method of claim 11 wherein step (f) comprises automatically selecting from the list an identified bearing having the smallest normalized accuracy error and communicating the selection to a user via a user interface.

17. The method of claim 11 wherein step (f) comprises displaying the list of identified bearings on a user interface and receiving a selection of an identified bearing entered by a user via the user interface.

18. The method of claim 11 further comprising generating and trending one or more energy band scalar values by summing energy over all harmonic peaks for each type of energy band over a period of time, wherein the energy band scalar values include one or more of a Ball Pass Frequency of the Inner race (BPFI), a Ball Pass Frequency of the Outer race (BPFO), a Ball Spin Frequency (BSF), and a Fundamental Train Frequency (FTF) for the identified bearing having a smallest normalized accuracy error.

19. The method of claim 11 further comprising consolidating the list of identified bearings by grouping the identified bearings having the same number of balls and having bearing fault frequencies falling within a specified frequency range.

* * * * *